(12) United States Patent
Swinkels et al.

(10) Patent No.: US 9,667,570 B2
(45) Date of Patent: May 30, 2017

(54) FABRIC EXTRA TRAFFIC

(75) Inventors: Gerard Swinkels, Ottawa (CA); James Tierney, Carp (CA)

(73) Assignee: Ciena Corporation, Hanover, MD (US)

( * ) Notice: Subject to any disclaimer, the term of this patent is extended or adjusted under 35 U.S.C. 154(b) by 604 days.

(21) Appl. No.: 12/966,245

(22) Filed: Dec. 13, 2010

(65) Prior Publication Data

US 2011/0222394 A1    Sep. 15, 2011

Related U.S. Application Data

(60) Provisional application No. 61/312,726, filed on Mar. 11, 2010.

(51) Int. Cl.
*H04L 12/939* (2013.01)
*H04L 12/801* (2013.01)
*H04L 12/861* (2013.01)

(52) U.S. Cl.
CPC ............ *H04L 49/55* (2013.01); *H04L 47/10* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 6,370,116 B1 * | 4/2002 | Giroux et al. | 370/232 |
| 6,473,815 B1 * | 10/2002 | Lu | H04L 47/6215 |
| | | | 370/402 |
| 6,879,559 B1 * | 4/2005 | Blackmon et al. | 370/225 |
| 6,904,014 B1 * | 6/2005 | Gai et al. | 370/230.1 |
| 7,602,701 B1 * | 10/2009 | Parker et al. | 370/217 |
| 7,969,886 B1 * | 6/2011 | Hoichman | 370/235 |
| 2004/0213149 A1 * | 10/2004 | Mascolo | 370/229 |
| 2007/0189169 A1 * | 8/2007 | Wu et al. | 370/235 |

* cited by examiner

*Primary Examiner* — Gregory Sefcheck
*Assistant Examiner* — Jenkey Van
(74) *Attorney, Agent, or Firm* — Clements Bernard Walker PLLC; Christopher L. Bernard; Lawrence A. Baratta, Jr.

(57) ABSTRACT

A method of forwarding traffic through a network node including an ingress IO card, an egress IO card, and a pair of parallel switch fabric cards. One of the switch fabric cards is designated as a working switch fabric card, and the other one of the switch fabric cards is designated as a protection switch fabric card. In the ingress IO card, the traffic flow is divided into a committed information rate (CIR) component and an extra information rate (EIR) signal. Under a normal operating condition of the node, the ingress IO card forwards the CIR traffic component through the working switch fabric card, and forwards the EIR traffic component through the protection switch fabric card. Upon detection of a failure impacting the working switch fabric card, the ingress IO card drops the EIR traffic component and forwards the CIR traffic component through the protection switch fabric card.

14 Claims, 2 Drawing Sheets

FABRIC EXTRA TRAFFIC

CROSS-REFERENCE TO RELATED APPLICATIONS

This application is based on, and claims benefit of provisional U.S. Patent Application Ser. No. 61/312,726 filed Mar. 11, 2010, the entire contents of which are hereby incorporated herein by reference.

MICROFICHE APPENDIX

Not Applicable.

TECHNICAL FIELD

The present invention relates generally to communications systems, and in particular to a method of handling extra traffic in a switching fabric of a network node.

BACKGROUND

FIG. 1 schematically illustrates a representative node 2 in a communications system. In the illustrated example, the node 2 comprises a pair of parallel switch fabric cards 4, a pair of network-facing Input/Output (IO) cards 6, and a client facing IO card 8. Each of the network-facing IO cards 6 is connected to the network 10 via a respective interface 12, and to both of the parallel switch fabric cards 4. The client facing IO card 8 is connected to a client domain 14, via a respective interface 16, and is also connected to both of the parallel switch fabric cards 4.

In conventional communications nodes, one of the parallel switch fabric cards 4 is designated as a working card (indicated by "W" in FIG. 1), and carries subscriber traffic during normal operation. The other switch fabric card 4 is designated as a protection card (indicated by "P" in FIG. 1), and carries subscriber traffic during a failure of the working card 4. Similarly, one of the network facing IO cards 6 is designated as a working card (indicated by "W" in FIG. 1), and carries subscriber traffic during normal operation. The other network facing IO card 6 is designated as a protection card (indicated by "P" in FIG. 1), and carries subscriber traffic during a failure of a connection through the working IO card 6w, either due to failure of the working IO card itself or its interface to the network 10.

As is known in the art, each IO card 6,8 forwards subscriber traffic to either the working switch fabric card 4w or the protection switch fabric card 4p, based on the operational status of the working switch fabric card 4w. Additionally, the working and protection switch fabric cards 4w and 4p forward subscriber traffic to either the working IO card 6w or the protection IO card 6p, based on the operational status of connections mapped through the working IO card 6w. With this arrangement, the node provides 1-to-1 protection against failures of any of the switch fabric cards 4, IO cards 6 or interfaces 12. In some cases, a pair of parallel client-facing IO cards 8 may be provided, in a mirror image of the arrangement shown for the network-facing IO cards 6, which provides 1-to-1 protection for the entire path between the client domain 14 and the network 10.

As is well known in the art, other protection schemes can be implemented for any of the switch fabric cards 4, network-facing IO cards 6, and client facing IO cards 8 as desired. In general, any of these elements may be configured to operate in an m:n protection scheme, in which m protection elements are provided for n working elements. Thus, for example, in a node 2 having 16 network-facing IO cards 6, a 1:7 protection scheme (for the network-facing IO cards 6) may be implemented by designating a set of m=2 of the IO cards 6 as protection IO cards 6p, and the remaining n=14 IO cards 6 as working IO cards 6w. Similarly, m:n protection schemes may be implemented in respect of the switch fabric cards 4 and the client facing IO cards 8. The ratio of protection to working elements may be determined in accordance with any desired criteria, and may be the same, or different for each of the switch fabric cards 4, network-facing IO cards 6, and client facing IO cards 8. In some cases, the ratio of protection to working elements may be based on the probability of failure of a particular component. In alternative cases, the ratio may be based on the recovery time of the network, service level guarantees provided by the network service provider, or the capacity of the network to re-route traffic around a failed element.

A limitation of prior art protection schemes described above is that when the working elements are operating properly, the protection elements are idle. For example, in the embodiment of FIG. 1, when the working switch fabric card 4w is operating properly, the protection switch fabric card 4p is idle. In order to enable high speed failure recovery, the protection switch fabric card 4p must be maintained in a "hot standby" state, in which it is receiving power and its connection state synchronized with that of the working switch fabric card 4w, but no traffic is being routed through the card. In some cases, the protection mechanism is "exercised" by forcing a protection switch operation at regular intervals. This has the effect of periodically toggling the status of the working and protection switch fabric cards, so that each card carries traffic during alternating periods, and so ensures that the operational status of each card can be verified. However, only one of the switch fabric cards 4 actually carries traffic at any given time. In effect, therefore, the node 2 is always operating at 50% of its capacity. One reason for implementing protection schemes other than the 1:1 scheme illustrated in FIG. 1, is that it offers the possibility of improving the operating efficiency of the node. For example, in a node having three switch fabric cards 4, a 1:2 protection scheme would mean that, with both of the n=2 working switch cards operating properly, the node 2 would be operating at an efficiency of about 66%.

Various methods have been proposed for managing traffic flows through working and protection paths in a network, so as to increase utilization of the network capacity. Thus, for example, methods are known by which a network path designated as a protection path for one traffic flow may be used to carry network traffic while the working path is operating normally. Typically, pre-emption rules are used to determine what traffic in the "protection" path can be dropped to free up capacity for traffic switched from the (failed) working path. Normally, the pre-emption rules are based on Quality of Service (QoS) criteria assigned to each of the traffic flows in question.

However, these methods typically operate on layer-2 (or higher) and rely on packet forwarding rules that forward packets to appropriate output ports based on information in the packet header. Thus, for example, in some cases, the packet header may contain information relating to a Service Level Agreement (SLA) or a QoS guarantee. In other cases, the packet header may contain information of a network service with which the packet is associated. In any of these arrangements, the information may be used to control how the pre-emption rules affect forwarding of the packet. While such methods provide good performance for traffic flows within the network, they are not readily applicable to physical-layer switching within a node, because the physical-layer switching mechanisms do not have awareness of the content of the packet header.

Techniques for forwarding traffic trough a network node switch fabric that overcome limitations of the prior art remain highly desirable.

SUMMARY

Accordingly, an aspect of the present invention provides a method of forwarding traffic through a network node including an ingress IO card, an egress IO card, and a pair of parallel switch fabric cards. One of the switch fabric cards is designated as a working switch fabric card, and the other one of the switch fabric cards is designated as a protection switch fabric card. In the ingress IO card, the traffic flow is divided into a committed information rate (CIR) component and an extra information rate (EIR) signal. Under a normal operating condition of the node, the ingress IO card forwards the CIR traffic component through the working switch fabric card, and forwards the EIR traffic component through the protection switch fabric card. Upon detection of a failure impacting the working switch fabric card, the ingress IO card drops the EIR traffic component and forwards the CIR traffic component through the protection switch fabric card.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION OF PREFERRED EMBODIMENTS

Figure 1:
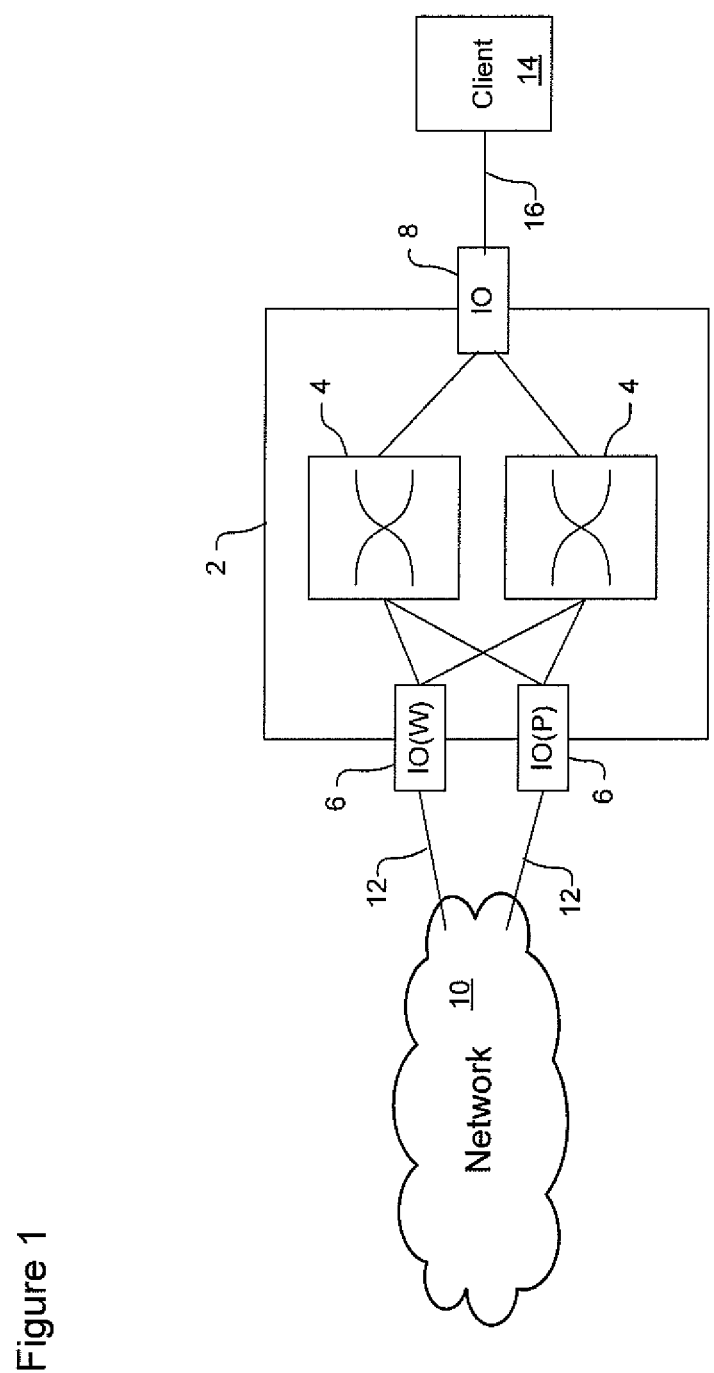
FIG. 1 schematically illustrates elements of a switching node in a communications system.

In very general terms, the present invention partitions a traffic flow into committed Information Rate (CIR) traffic and Extra Information Rate (EIR) traffic. The CIR traffic is routed through the working switch fabric card 4w, while the EIR traffic is routed through the protection switch fabric card 4p.

The committed Information Rate (CIR) traffic may be traffic falling within a Quality of Service (QoS) requirement of a service agreement, such as, for example a guaranteed minimum bandwidth. Extra Information Rate (EIR) traffic may be additional traffic that exceeds the QoS requirement of the service agreement, but which the network service provider agrees to support when there is sufficient capacity in the network. Other criteria may be used to designate CIR and EIR components of a traffic flow.

An important feature of the present technique is that the separate routing of CIR and EIR traffic components through the node 2 is controlled by the connection state configured in the node, and does not depend on the content of the packet header. For example, all traffic to and from the client domain 14 is assigned to a respective intra-switch connection between the respective client-facing interface 16 and a selected one of the network-facing interfaces 12. The connection state installed in the switch fabric cards 4 for implementing the intra-switch connection includes physical-layer parameters associated with the traffic flow, including, for example, latency specifications, minimum and/or maximum bandwidth limits, queuing priority etc. These parameters can be used to identify and separate the CIR and EIR traffic components.

For example, when the total traffic flow to or from the client domain 14 is within a minimum bandwidth limit specification of the intra-switch connection, all of that traffic can be designated as CIR traffic. On the other hand, when the total traffic flow to or from the client domain 14 exceeds the minimum bandwidth limit specification, then the traffic flow can be divided into respective CIR and EIR components, in which the bandwidth of the CIR component matches the minimum bandwidth limit specification, and the EIR component represents the "excess" traffic. An advantage of this arrangement is that the separation of the traffic into CIR and EIR components can be based on parameters that are known in the physical layer, and do not require awareness of the content of the packet header.

Both of the switch fabric cards 4w and 4p have connection state installed, for any given traffic flow, to the same egress IO card. As a result, under normal operating conditions, the ingress IO card can direct the CIR and EIR components of the traffic flow to the working and protection switch fabric cards, respectively, and these cards will automatically route the traffic to the proper egress IO card. The egress IO card then recombines the CIR and FIR components of the traffic flow.

Figure 2:
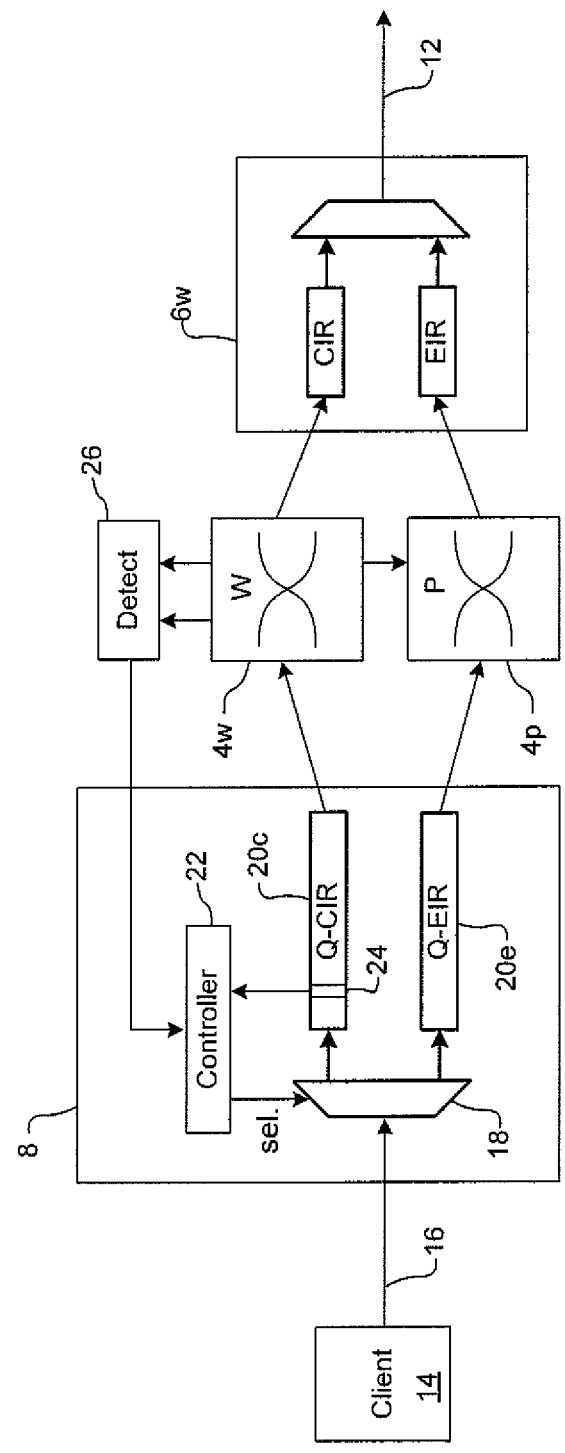
FIG. 2 is a block diagram schematically illustrating operation of a switching node in accordance with an embodiment of the present invention.

FIG. 2 illustrates an example in which the traffic flow from the client domain 14 is divided into respective CIR and EIR components based on traffic volume, and recombined in the network facing IO card 6. In this case, the client facing IO card 8 serves as the ingress IO card, and the network facing IO card 6 serves as the egress IO card. In the example of FIG. 2, the intra-switch connection is composed of a pair of physical paths, which may respectively be referred to as a committed path for carrying CIR traffic through the working switch fabric card 4w, and an extra path for carrying EIR traffic through the protection switch fabric card 4p. The committed and extra paths are mapped through the respective switch fabric cards 4 to the working network-facing IO card 6w, which is configured to recombine the CIR and EIR traffic components to recover the original traffic flow, which can then transmitted through the network facing interface 12.

As may be seen in FIG. 2, the client facing IO card 8 includes a demux function 18 for selectively routing traffic received from the client domain 14 to a pair of queues 20c, 20e, each of which serves a respective one the committed and extra paths. Each queue 20 operates to buffer traffic prior to transmission through the corresponding physical path, in a manner known in the art. Traffic is read from the committed traffic queue 20c, and transferred through the committed path, at a rate that is sufficient to ensure that the minimum bandwidth guarantee of the service agreement can be satisfied using that queue alone. Accordingly, in a default condition, a controller 22 can control the demux function 18 such that all of the traffic received from the client domain 14 is supplied to the committed traffic queue 20c. If, at any time, the committed traffic queue reaches a predetermined maximum fill 24 (or, alternatively, overflows) then it can be determined that the total traffic flow from the client domain 14 has exceeded the minimum bandwidth limit specification. In this case, the controller 22 can control the demux function 18 such that any further traffic from the client domain 14 is routed to the extra traffic queue 20e, and thus transferred to the network facing IO card 6 via the protection switch fabric card 4*p*. When the fill ratio of the committed traffic queue 20*c* drops below the maximum fill 24, the demux function 18 can be returned to the default condition, so that traffic from the client domain 14 is again routed to the committed traffic queue 20*c*. As may be appreciated, this arrangement ensures that all traffic from the client domain 14 that is within the minimum bandwidth limit specification is designated as CIR traffic and routed through the committed traffic path, and any excess traffic from the client domain 14 is designated as EIR traffic and routed through the extra traffic path. It will also be seen that the separation of traffic into CIR and EIR flows is accomplished entirely on the basis of information known in the physical layer (in this case, the queue fill), and does not require any knowledge of the content of the packet header.

In some embodiments, the routing of traffic by the demux function 18 is performed on a per-packet basis. This is advantageous in that it ensures that a packet is not split between the two queues 20, and thus avoids a problem of properly reassembling the packet in the egress IO card 6.

In some embodiments, the demux function 18 can be controlled in a predictive manner, based on the size of a received packet. Thus, for example, if the current free space of the committed queue 20*c* is smaller than the size of the received packet, then it can be predicted that routing the packet to the committed queue 20*c* would cause a maximum fill (or overflow) condition of that queue. If this were to happen, either some of the bytes of the packet may be lost, or else the total traffic volume of the CIR traffic would have to exceed the minimum traffic specification. Both of these outcomes may be undesirable. In order to avoid his problem, the controller 22 can respond to the predicted maximum fill (or overflow) condition by controlling the demux function 18 to route the packet to the extra traffic queue 20*e*, and so preventing either a loss of bytes or a situation in which the EIR traffic from exceeds the minimum traffic specification.

In the event of a failure of either switch fabric card 4, EIR traffic is dropped. If the failure impacted the working switch fabric card 4*w*, then the CIR traffic is protection switched to the protection switch fabric card 4*p*. This protection switching operation can be handled entirely by the ingress IO card. Thus, continuing the example of FIG. 2, upon detection of a failure of the working switch fabric card 4*w* (at 26), the controller 22 can control the demux function 18 to route all of the traffic received from the client domain 14 to the extra traffic queue 20*e* for forwarding through the protection switch fabric card 4*p*. Packets read from the extra traffic queue 20*e* will then be properly routed through the protection switch fabric card 4*p* to the appropriate network facing IO card 6, without having to change the connection state of the protection switch fabric card 4*p*, or update the network facing IO card 6 handling that traffic flow. As long as the total volume of traffic received from the client domain 14 is within the bandwidth capacity of the extra traffic path, this traffic can be treated as CIR traffic. In this case however, if the extra traffic queue reaches a maximum fill (or overflow) condition, the excess traffic (which would otherwise be considered as EIR traffic) is dropped, because there is no other path through which this excess traffic may be routed.

In some embodiments, each IO card 6,8 is designed such that its total capacity is divided between the CIR and EIR traffic components. For example, each IO card 6,8 may be designed such that 50% of its total capacity is assigned to CIR traffic, and 50% of its total capacity is assigned to EIR traffic. This arrangement ensures that the EIR traffic can grow to equal the CIR traffic, while at the same time guaranteeing that the total traffic flow (CIR and EIR components taken together) is within the capacity of the IO card.

In the foregoing description, separation of a received traffic flow into CIR and EIR flows in the ingress IO card, and recombination of the CIR and EIR flows in the egress IO card is described with reference to the flow of traffic originating at the client system 14, as shown in FIG. 2. It will be appreciated that substantially identical functionality can be provided in the opposite direction, for traffic destined for the client system 14.

In the foregoing description, the present invention is described with reference to an example embodiment in which the node 2 operates as an access gateway between the client system 14 and a network 10. However, it will be appreciated that the present invention is not limited to such embodiments. Rather, those or ordinary skill in the art will recognise that the methods of the present invention may be implemented in any node through which a physical-layer traffic flow is mapped between an ingress port and an egress port via at least two parallel switch fabric cards, each of which provides a forwarding path of a predetermined bandwidth between the involved ingress and egress ports.

In the example described above with reference to FIGS. 1 and 2, the node 2 is provided with 2 switch fabric cards 4, one of which is designated as a working switch fabric card 4*w*, and the other one of which is designated as a protection switch fabric card 4*p*. As mentioned above, this arrangement implements a 1:1 protection scheme between the switch fabric cards. However, it will be appreciated that the present invention is not limited to such embodiments. Rather, those or ordinary skill in the art will recognise that the methods of the present invention may be implemented in any node having two or more parallel switch fabric cards, implementing an m:n protection scheme. In simple embodiments, the traffic flow received at the ingress IO card (or port) is divided into two parallel flows as described above; with one of the flows designated as the CIR flow and routed through one of the n working switch fabric cards, and the other one of the flows designated as the EIR flow and routed through one of the m protection switch fabric cards. Such an arrangement permits the same functionality as that described above with reference to FIG. 2. Alternatively, the traffic flow received at the ingress IO card (or port) may be divided in other ways, to exploit the increased flexibility afforded by the availability of multiple switch fabric cards. For example, a respective physical path may be mapped through each one of the switch fabric cards, and the traffic flow divided by the ingress IO card (or port) based on the traffic flow volume (bandwidth demand) as described above with reference to FIG. 2. Thus, for example, when the committed traffic queue 20*c* reaches its maximum fill, the excess traffic is directed to a first extra traffic queue 20*e*, as described above. When both of these queues reach their maximum fill, the excess traffic "spills" over into a second extra traffic queue, and so on. If desired, this functionality could be used by a service provider to implement a bandwidth-based billing scheme, in which different billing rates could be applied to different bandwidth utilisation rates.

Although the invention has been described with reference to certain specific embodiments, various modifications thereof will be apparent to those skilled in the art without departing from the spirit and scope of the invention as outlined in the claims appended hereto.

We claim:

1. In a network node including an ingress IO card, an egress IO card, and a pair of parallel switch fabric cards, wherein one of the switch fabric cards is designated as a working switch fabric card, and the other one of the switch fabric cards is designated as a protection switch fabric card, a method of forwarding a traffic flow from the ingress IO card to the egress IO card, the method comprising, in the ingress IO card:

dividing the traffic flow into a committed information rate (CIR) component and an extra information rate (EIR) component based on connection state based entirely on physical-layer parameters of the traffic flow exclusive of Layer-2 and higher parameters and awareness of associated packet header contents, wherein the CIR component comprises a first portion of the traffic flow within a predetermined minimum bandwidth limit specification, and the EIR component comprises an excess portion of the traffic flow above the predetermined minimum bandwidth limit specification, wherein dividing the traffic flow comprises:

routing all the packets of the traffic flow to a committed traffic queue as the CIR component until a predetermined condition is satisfied; and when the predetermined condition is satisfied, routing packets of the traffic flow to an extra traffic queue as the EIR component, wherein packets of the traffic flow are read out of at least the committed traffic queue at a rate corresponding to the predetermined minimum bandwidth limit specification;

under normal operating condition of the node, forwarding the CIR component through the working switch fabric card, and forwarding the EIR component through the protection switch fabric card;

upon detection of a failure impacting the working switch fabric card, dropping the EIR component and forwarding the CIR component through the protection switch fabric card.

2. The method as claimed in claim 1, wherein the predetermined condition is a maximum fill of the committed traffic queue.

3. The method as claimed in claim 1, wherein the physical-layer parameters comprise queue fill.

4. The method as claimed in claim 1, wherein the physical-layer parameters comprise one or more of latency specifications, minimum and/or maximum bandwidth limits, and queuing priority.

5. The method as claimed in claim 1, wherein the physical-layer parameters have no awareness of contents of packet headers in the traffic.

6. A non-transitory computer readable medium storing software instructions for controlling a network node to implement a method of forwarding a traffic flow from an ingress IO card to an egress IO card, the method comprising, in the ingress IO card via a pair of parallel switch fabric cards, wherein one of the switch fabric cards is designated as a working switch fabric card, and the other one of the switch fabric cards is designated as a protection switch fabric card, the method comprising, in the ingress IO card:

dividing the traffic flow into a committed information rate (CIR) component and an extra information rate (EIR) component based on connection state configured in the network node, wherein the connection state is based entirely on physical-layer parameters of the traffic flow exclusive of Layer-2 and higher parameters and awareness of associated packet header contents, wherein the CIR component comprises a first portion of the traffic flow within a predetermined minimum bandwidth limit specification, and the EIR component comprises an excess portion of the traffic flow above the predetermined minimum bandwidth limit specification, wherein dividing the traffic flow comprises:

routing all the packets of the traffic flow to a committed traffic queue as the CIR component until a predetermined condition is satisfied; and when the predetermined condition is satisfied, routing packets of the traffic flow to an extra traffic queue as the EIR component, wherein packets of the traffic flow are read out of at least the committed traffic queue at a rate corresponding to the predetermined minimum bandwidth limit specification;

under a normal operation condition of the node, forwarding the CIR component through the working switch fabric card, and forwarding the EIR component through the protection switch fabric card;

upon detection of a failure impacting the working switch fabric card, dropping the EIR component and forwarding the CIR component through the protection switch fabric card.

7. The non-transitory computer readable medium as claimed in claim 6, wherein the physical-layer parameters comprise queue fill.

8. The non-transitory computer readable medium as claimed in claim 6, wherein the physical-layer parameters comprise one or more of latency specifications, minimum and/or maximum bandwidth limits, and queuing priority.

9. The non-transitory computer readable medium as claimed in claim 6, wherein the physical-layer parameters have no awareness of contents of packet headers in the traffic.

10. A network node comprising:
an ingress IO card;
an egress IO card; and
a pair of parallel switch fabric cards, one of the switch fabric cards being designated as a working switch fabric card, and the other one of the switch fabric cards being designated as a protection switch fabric card;
the ingress IO card being configured to:
divide the traffic flow into a committed information rate (CIR) component and an extra information rate (EIR) component based on connection state configured in the network node, wherein the connection state is based entirely on physical-layer parameters of the traffic flow exclusive of Layer-2 and higher parameters and awareness of associated packet header contents, the CIR component comprising a first portion of the traffic flow within a predetermined minimum bandwidth limit specification, and the EIR component comprising an excess portion of the traffic flow above the predetermined minimum bandwidth limit specification, wherein the ingress IO card is configured to divide the traffic flow by:
route all of packets of the traffic flow to a committed traffic queue at the CIR component, until a predetermined condition is satisfied; and
responsive to the predetermined condition being satisfied, routing packets of the traffic flow to an extra traffic queue as the EIR component, wherein packets of the traffic flow are read out of at least the committed traffic queue at a rate corresponding to the predetermined minimum bandwidth limit specification;
forward, under a normal operating condition of the node, the CIR component through the working switch fabric card, and the EIR component through the protection switch fabric card;

responsive to detection of a failure impacting the working switch fabric card, drop the EIR component and forward the CIR component through the protection switch fabric card.

11. The network node as claimed in claim 10, wherein the predetermined condition is a maximum fill of the committed traffic queue.

12. The network node as claimed in claim 10, wherein the physical-layer parameters comprise queue fill.

13. The network node as claimed in claim 10, wherein the physical-layer parameters comprise one or more of latency specifications, minimum and/or maximum bandwidth limits, and queuing priority.

14. The network node as claimed in claim 10, wherein the physical-layer parameters have no awareness of contents of packet headers in the traffic.

* * * * *